United States Patent Office 3,137,666
Patented June 16, 1964

3,137,666
MODIFIED HIGH MOLECULAR WEIGHT POLY-
VINYL CHLORIDE RESIN COATINGS FOR
METAL, COMPOSITIONS AND METHOD OF
COATING
Walter E. Lox, Chicago, and Edward S. Beck, Park
Forest, Ill., assignors to Enterprise Paint Manufacturing
Company, Chicago, Ill., a corporation of Illinois
No Drawing. Filed Mar. 10, 1958, Ser. No. 720,090
25 Claims. (Cl. 260—19)

This invention relates to protective coatings, method of forming such coatings and articles coated therewith. More particularly, the invention is directed to modified polyvinyl chloride coating compositions and the resultant coated articles which are characterized by an ability of the coating to adhere strongly and directly to bare metal without the use of primer or other undercoat, and the finish of which coatings further may be of high or low gloss, of smooth or textured surfaces, and of uniform or multi-colored appearance.

The high molecular weight polymer vinyl chloride resins, when appropriately plasticized, have been used rather extensively in the manufacture of sheeting and various extruded and/or molded objects because of their strong resistance to weathering and oxidation, chemical inertness and electrical resistivity, non-flammability and ease of fabrication. More recently, dispersions of the resin in plasticizer, or in plasticizer and organic solvent, have been developed for use in coating paper and various textiles. Such dispersions are commonly known as plastisols when essentially solvent free. If significant quantities of volatile non-aqueous solvents are used in the dispersing medium in addition to the plasticizer, they are then designated as organosols. Such sols ordinarily consist of a fine particle dispersion of vinyl resin which is essentially high molecular weight polyvinyl chloride having a particle size ranging from about 0.2 to 2.0 microns and a molecular weight of approximately 20,000 to 30,000; although in some instances the high molecular weight polyvinyl chloride may be in interpolymerization with small amounts of other modifying resins. These interpolymers are intended to be included within the term "high molecular weight polyvinyl chloride" as hereinafter used. Additionally the sols include appropriate amounts of light and heat stabilizers, pigments and extenders. These dispersion systems depend for their usefulness upon the fact that the polyvinyl chloride is relatively insoluble in plasticizer at room temperature, but becomes soluble therein at elevated temperatures. Thus, when a coating of the dispersion is applied to the surface of a substrate, the discrete, partially solvated polyvinyl chloride particles form agglomerates thereof, i.e., a discontinuous film. However, on the application of heat, the discrete resin particles fuse into a continuous impermeable film. Depending on the type and quantity of plasticizer, the particle size and molecular weight of the polyvinyl chloride, as well as the thickness of the film deposited, thermo-conductivity of the substrate and other factors, the necessary temperature to obtain fusion will range from approximately 300° F. to 600° F. and the time of baking will range from 1 to 20 minutes.

These vinyl chloride sols have many advantages for coating purposes as is well known. Thus plastisols can be made to extremely high solids content up to 100%, while remaining reasonably mobile and fluid. Also, films of great thickness can be deposited. For example, a single thickness as high as 20 mils can be formed in a single application. When fully cured, properly plasticized films of the aforesaid high molecular weight polyvinyl chloride show remarkably good flexibility, toughness, abrasion resistance, and impact resistance. Where it has been possible to obtain a good bond with the surface to which they were applied, such films also showed excellent durability when exposed to climatic extremes of temperature and humidity. They are considered to be light-fast and show water resistance as well as resistance to mild acids and alkalis and an inertness to the action of many commonly encountered reagents and solvents.

While for these reasons the high polymeric vinyl chloride dispersions have been used extensively for coating paper and textiles, the metal fabricating industries have been slow to use these coatings, principally because of the poor adhesion such high polymer vinyl chloride have to smooth surfaces, particularly to bare metals, such as tin plate, aluminum and steel, which have found wide application in the metals fabricating industries. In the past, it was therefore considered essential first to apply a primer coat, and then to apply the polyvinyl chloride coating thereover. This, however, was economically undesirable.

Lower molecular weight vinyl polymer resins, particularly copolymers of lower molecular weight vinyl chloride and vinyl acetate which have been modified by the incorporation of polar groups, have much better adhesion to smooth surfaces, including bare metals. Their value as protective coatings, however, is much less, and in the past these materials have been used principally as primer coats over which the higher molecular weight polyvinyl chloride would be applied. One example of such a resin is Vinylite VMCH, which is described as a vinyl chloride-vinyl acetate-maleic anhydride inter polymer combined in the approximate ratio of 86/13/1. Another example is Vinylite VAGH, which is a partially hydrolyzed copolymer of vinyl chloride and vinyl acetate comprising approximately 91%, 3% and 6% respectively, of vinyl chloride, vinyl acetate and vinyl alcohol.

In view of the success achieved in modifying the lower molecular weight vinyl chloride-vinyl acetate copolymers to obtain adhesion to metals and other smooth surfaces, it has also been proposed to add maleic, hydroxyl and other polar groups to the aforementioned higher molecular weight polyvinyl chloride resins in order to improve adhesion thereof, but, thus far, such attempts have met with no degree of success.

Thus a first and primary object of the present invention was to provide a plastisol or organosol of polyvinyl chloride which would adhere directly to smooth surfaces including bare metal without the need for a primer coat, and which adhesion would be obtained without sacrificing the highly desirable protective and other useful characteristics of the high molecular weight vinyl chloride resins, as, for example, resistance to weather, oxidation, and chemical inertness.

Another object of the invention was to provide a modified high molecular weight polyvinyl chloride coating composition, the resultant coated article and method of forming the same, wherein the coating obtained by applying said composition in a thin layer and baking would not only retain all of the aforesaid desirable properties of the polyvinyl chloride, but would also adhere well to bare metal without the benefit of an interposed primer coat, and would further be capable of flexing or otherwise yielding sufficiently to remain adherent to a metal sheet as, and after, it is flexed, bent or otherwise reshaped from its initial form, as, for example, in the fabrication of Thermos jugs or screw type bottle covers from flat sheet stock that has previously been coated therewith.

This we have found could be obtained conveniently by combining with the plastisol at least two heat-reactive resins, that is resins containing reactive groups in their molecular structure, which on the application of heat sufficient to fuse the polyvinyl chloride unite into an adhesive product bonding to the metal or other smooth surface, and provide a lattice or network for retaining the polyvinyl chloride particles when homogeneously dispersed therethrough. In accomplishing this, we have found it highly desirable that at least one of the resins be of the amino aldehyde type, such as urea formaldehyde, melamine formaldehyde or triazine formaldehyde or a polyamide resin. The other may be from the group comprising epoxy resins, butoxy resins, alkyl or aryl isocyanates, phenolic resins and other thermosetting and reactive resins containing hydroxyl, amino, phenolic or carboxyl groups. Examples of the phenolic resins include o-cresol formaldehyde and both substituted and unsubstituted phenol formaldehydes. The most satisfactory results, we have obtained thus far, occurred when both phenolic resin and epoxy resin plus urea formaldehyde were added as the reactive resins. However, the phenolic resins do exert a rather strong discoloring effect on the resultant coating, so that when pure white or pastel colored coatings are required, the phenolic resin is preferably omitted. We have also noted that an improved adhesive effect can be obtained wherein one of the heat reactive resins is a copolymer of vinyl ester and the aforementioned lower molecular weight vinyl chloride modified by the addition of hydroxyl, carboxyl or other polar groups, however, provided that the first reactive resin is a thermosetting resin of the aminoaldehyde class such as urea formaldehyde. We have also found that good results can be obtained where the first thermosetting resin is a polyamide. On the other hand, we have found that mixtures of epoxy resin and phenolic resin alone are also useful, although to a less degree than when an amino aldehyde or polyamide resin is also present.

One of the difficulties attendant to the employment of these added resins containing reactive groups was their lack of solubility in solvents that could be used with the higher molecular weight polyvinyl chloride resin. This is particularly true in the case of the maleic modified vinyl copolymer resin. On the other hand no unusual difficulty was incurred in dispersing the amino aldehyde type resin through the plasticizer into which the polyvinyl chloride resin particles were subsequently dispersed. In the case of the maleic modified vinyl copolymer and phenolic resins, we have found it important that they be separately mixed in appropriate solvents and the solvent mixture dispersed with agitation through the polyvinyl chloride resin—plasticizer dispersion. The selected solvent or solvents should be sufficiently powerful to dissolve the maleic modified copolymer resin but strong solvents including esters and ketones such as methyl-isobutyl ketone should be kept at a minimum to avoid unnecessary solvation or swelling of the higher molecular weight polyvinyl chloride. Thus we have found that the composition of the liquid phase, i.e. the ratio of dispersant to diluent is critical, since it not only affects the viscosity but stability of the system as well. While a limited amount of solvation of the polyvinyl chloride may be desirable to avoid settling at normal room temperatures, excessive solvation must be avoided in order to prevent formation of a solid gel. Of course, if the coating composition is to be used immediately on combining, this problem is of little significance.

In accordance therewith, another object of the invention was to modify high polymer vinyl chloride coating composition so as to promote their adhesion while controlling the viscosity of said compositions in order to produce stable and non-gelling compositions.

A further object of the invention was to modify high polymer polyvinyl chloride dispersions or coating compositions as by the addition of modifying resins which will promote the adhesive properties of the coatings.

Still another object of the invention was to provide means and method of modifying a polyvinyl chloride coating dispersion by the addition thereto of at least two resins containing reactive groups which will react with each other and wherein at least one of said resins is thermosetting.

Still another object of the invention was to promote the adhesive properties of polyvinyl chloride plastisols by the incorporation therein of at least two heat reactive resins, one of which will be an amino formaldehyde such as urea, melamine, or triazine formaldehyde, or a fatty acid polyamide and another will be a thermosetting resin such as the epoxy or phenolic resins or will be a copolymer of vinyl chloride and vinyl ester modified to contain polar groups, such as carboxyl or hydroxyl radicals, and/or mixtures of such resins or copolymers.

In accordance with the invention, a still further object was to provide novel means and methods by which a protective coating of polyvinyl chloride may be applied to a smooth surface, and which will have a smooth or textured surface of high or low gloss and which will be of uniform or multi-colored appearance.

A further object is to provide such a coating which can be applied as a single layer directly to a surface, such a bare coating having the desired texture, gloss and/or colored appearance.

Still another object of the invention was to provide polyvinyl chloride coatings as aforedescribed and compositions thereof, as well as methods of making such coatings and compositions, wherein the coatings have a smooth surface texture or an undulated irregular appearance resembling leather, fabric or beaten metal.

Previous to the present invention, it has been possible to achieve an undulated surface texture in a polyvinyl chloride surface coating. However, a primer coat was required to obtain adhesion. Moreover, the desired undulating effect was obtained only by interrupting the fusing of the polyvinyl chloride at an intermediate stage which was deemed critical and at which point the surface character of said partially cured resin was modified by chemical or mechanical means. This was accomplished usually by either embossing the incompletely fused resin with a suitable die or by applying a swelling agent such as cyclohexanone to the surface thereof in a controlled pattern. Fusing of the resin would then be resumed. However, these prior art processes were not economically satisfactory. The processes were exceedingly complicated and predicated on a necessity for applying multiple layers of material, each of which required its own peculiar curing cycle. Such processes were therefore unavoidably both slow and expensive to operate.

Accordingly, a further and principal object of the present invention was to devise a coating composition and method of its application by which a desired undulation or irregular surface texture could be obtained in a surface coating without resorting to the complicated, slow and economically impractical methods of the prior art previously thought essential.

More specifically, an object of the invention was to provide an undulated surface coating which would adhere well to metal without the requirement of a primer or other undercoat, and of a chemical composition such that it could be applied to bare metal by conventional techniques, such as roller-coating, dipping, or spraying, and would, on moderate baking, fuse into a tough, resistant, flexible and adherent protective coating having an undulated or irregular surface of predictable character.

A further and more specific object of the invention was to provide such a coating and method of making the same which would in appearance have a beaten metal effect.

Another specific object of the invention was to provide a coating and method of making the same which would give to the coated substrate an appearance of leather.

In accordance with these objects, the inventors found that the gloss as well as texture of their coatings could be conveniently and practicably modified or adjusted by the addition thereto of selected surfactants and/or texturing agents whereby a variety of appearances might be obtained ranging from the aforementioned beaten metal, leather, fabric or other undulated effect, to a lacy metallic appearance or a smooth finish of dull or high gloss. Also through the selective addition of chromogens and/or pigments, the inventors found that they could obtain both uniform and multi-colored effects in the coatings and which would be in addition to or in place of the mentioned textures and which further could be controlled to particularly enhance the undulated or irregular texture of said coatings and produce further and numerous other desired effects or appearances.

Thus an important object of the invention was to provide coating compositions, methods of applying the same, and the resultant coated articles, which would not only adhere well to metal and various other smooth surfaces as well as afford protection thereto but which, when baked, would fuse into a decorative coating of desired color, or colors, and having a predictable surface pattern and/or texture of desired simulation.

As a supplement thereto, a further object was to provide such coatings which would in addition obtain the desired adherence without benefit of a primer coat and would obtain the desired surface texture, gloss and/or color without chemical or mechanical treatment of the applied coating, but would instead be controlled by the composition of the coating material itself.

Many other objects as well as advantages and features of the invention will be or will become obvious or apparent from the more detailed description of the invention, and how it may be practiced which will now be described.

More specifically, in accordance with the invention, a protective and decorative coating having excellent adherence to bare metals and other smooth surfaces of organic or inorganic character can be obtained by applying directly to bare metal or other surface a coating composition of the following approximate formulation using any one of several conventional and well known industrial techniques, such as by spraying, dipping, roller-coating, knife blade, flow-coat. The applied coating is then baked at a temperature between 300° and 600° F., preferably near 400° F. or until the solvent portion has been evaporated and sufficient to cause the ingredients to fuse into a continuous, tough, chemically inert and heat, light and weather resistant film which strongly adheres to the metal or other surface.

Although the proportions for the ingredients making up the coating composition may vary considerably in accordance with the specific properties desired therefor, in the following example, we have set forth what we consider to be the most useful range of proportions and additionally what we consider to be an optimum proportion in which said ingredients should be combined for the usual industrial applications. The proportions of each ingredient are given in parts by weight based on 100 parts of polyvinyl chloride which is taken as the starting material.

EXAMPLE I

| Ingredient | Optimum Proportion | Range of Useful Proportions |
|---|---|---|
| Polyvinyl chloride | 100 | 100 |
| Plasticizer | 60 | 15-100 |
| Wax solution (15% wax-balance solvent) | 20 | 0-100 |
| Heat stabilizer | 4 | 2-10 |
| Light stabilizer | 3 | 1-6 |
| Amino formaldehyde resin | 15 | 5-20 |
| Phenolic resin | 4 | 0-25 |
| Epoxy resin | 5 | 0-50 |
| Maleic modified vinyl chloride-vinyl acetate copolymer | 15 | 0-25 |
| Partially hydrolyzed vinyl chloride-vinyl acetate copolymer | 5 | 0-25 |
| Non-aqueous organic solvent | 100 | 0-250 | together with such amounts of pigment and/or surfactants, texturing agents and chromogens as may be required in accordance with whether a coating of high or low gloss, with a smooth or undulated surface texture, or of uniform or multi-colored appearance is desired, as will be hereinafter more specifically described.

The polyvinyl chloride of choice comprises the aforementioned high molecular weight polyvinyl chloride or interpolymer thereof such as is conventionally used in plastisols and organosols and is considered to have a molecular weight of approximately 20,000 to 30,000 measured by the Staudinger method and an intrinsic viscosity of 0.2 to 0.3. The resin has preferably been ball-milled or otherwise processed to a particle size between approximately 0.2 to 2.0 microns. Examples of useful commercially available polyvinyl chloride are Vinylite QYNV, Geon 121, 126, Opalon 410, Marvinol VR-10, Exon 654, Pliovic AO and Vinylite VYNV. When applied as a thin coating from a dispersion to the surface of a given substrate the polyvinyl chloride tends to form, or is deposited as, discrete particles constituting a noncontinuous layer, but, when subjected to a temperature in the aforesaid baking range, the resin softens and its solubility in the plasticizers increases whereby the discrete particles fuse into a substantially continuous film affording the desired protection. However because of its general inertness and lack of chemical activity, such high molecular weight polyvinyl resin, even when fused, does not bond well to smooth surfaces and has particularly poor adhesion to bare metal.

The plasticizer in which the polyvinyl chloride is dispersed according to our invention may be any of the plasticizers as are conventionally combined with the resin in plastisols or organosols intended for coating purposes. Examples of useful solvent type plasticizers include di-2-ethylhexyl phthalate, tricresyl phosphate, dicapryl phthalate, butyl esters of acetylated polymerized ricinoleic acids, dibutoxyethyl phthalate, tri-2-ethyl-hexyl phosphate, methoxy-ethyl-acetyl ricinoleate, triethylene glycol di-2-ethyl hexoate and triethylene glycol esters of coconut oil fatty acids. Examples of useful resinous plasticizers include the epoxidized oils and polyesters. Other plasticizers less frequently used include butyl phthalate, butyl glycolate, dibutyl phthalate, diamyl or dibutyl sebacate, di-2-ethyl hexyl sebacate, and tributyl phosphate. Preferably we employ a mixture of plasticizers, both of the resinous and of the solvent type. The preferred plasticizer comprises acetyl tributyl citrate which is of low toxicity, soluble in most organic solvents and is also relatively resistant to heat and light. With the acetyl tributyl citrate we usually add equal amounts of polyethylene glycol-di-2-ethyl hexoate and Paraplex G-62 which is an epoxidized soybean oil having a 6.6% oxirane oxygen constant produced according to U.S. Patent 2,822,368. Although, obviously, the proportions in which the polyvinyl chloride and plasticizer may be combined will vary in accordance with the purpose to which the coated substrate is to be put, in coating metal and other surfaces particularly where it is not only important to obtain good coverage as well as protection but also flexibility, we have found that a particular useful proportion of plasticizer will equal roughly 60% of the polyvinyl chloride content-by-weight.

We have also found it is essential to include in the coating composition smaller amounts of heat and light stabilizers since like most chlorinated high polymers the polyvinyl chloride of choice tends to decompose on long standing in light under atmospheric conditions or when subjected to moderate heating. This can be overcome by the addition of small amounts of organo-metal complexes such as calcium, cadmium or lead soaps, calcium or lead acetates, oxides of bismuth, barium or lead, silicates of sodium, calcium or lead, and lead salts of substituted phenols such as para-tertiary butyl phenol. Where clarity or non-toxicity are not of importance, other materials such as lead silicate, basic white lead, calcium stearate and lead stearate may be used. The most effective inhibitors against thermal decomposition are the various organo-metallic compounds which contain tin or lead. An example thereof is dibutyl tin laurate or dibutyl tin maleate. Such stabilizers are particularly useful to prevent decomposition as when the coating is subjected to excessive heat during processing or service life. They also help to prevent degradation by ultra violet light.

We have further found it desirable that the basic formulation also include a small amount of wax which improves the slipperiness of the coating. In Example I, we have indicated that the wax is conveniently added to the plasticizer mixture when diluted in a suitable solvent such as naphtha.

In order to overcome the reluctance of the polyvinyl chloride resin to adhere to a surface on which the coating is applied, the formulation of Example I also includes at least two further resins which we define as heat-reactive resins because they contain reactive groups in their molecular structure which on the application of heat sufficient to fuse the polyvinyl chloride unite to form an adhesive product which strongly bonds the polyvinyl chloride to the bare metal surface. One of these is a thermosetting amino aldehyde condensation product such as urea formaldehyde, melamine formaldehyde or triazine formaldehyde, and the other is preferably also a thermosetting resin such as an epoxy resin which is a reaction product of epichlorohydrin and bis phenol. The epoxy resin, however, may be replaced in whole or in part by any of the various alkyl-, aryl- or aralkyl-isocyanates or polyamides. It may also be replaced in whole or in part by phenolic resins of which o-cresol formaldehyde, alkyl-or aryl-substituted phenol formaldehyde and unsubstituted phenol formaldehyde are examples. The second resin instead of being thermosetting may be a resin which contains reactive groups in its molecular structure capable, under the application of heat, of cross-linking or otherwise reacting with the amino aldehydes aforementioned. An example of this latter group is maleic modified vinyl chloride-vinyl acetate copolymer. Ordinarily, however, the total content of reactive resin other than the amino formaldehyde will not exceed 50 parts per 100 parts of polyvinyl chloride. For that matter, we have found that a useful improvement in adhesion to metal can be obtained wherein any two of the aforementioned reactive resins are added to the composition, and/or where one of the thermosetting resins is replaced in whole or in part by a vinyl resin copolymer containing carboxyl or other polar groups. For example, useful results have been obtained where reliance is had on phenolic resin and epoxy resin as the sole additive resins to the coating composition, although the degree of adhesion is not as satisfactory as that obtained where urea formaldehyde constitutes one of the added resins. In the composition according to Example I the amino formaldehyde may be also replaced in whole or in part by any of the fatty acid polyamides.

Although any of the commercially available polyamides may be used, we prefer the more highly reactive semi-solid or fluid types of which the Versamids 100, 115 and 125 are examples. These amides are amine terminated condensation products of soy bean fatty acids, such as linoleic acid and diethylene triamine according to the reaction:

$$n(HOOC—R—COOH)+n(H_2N—R'NH_2$$
$$\rightarrow HO(—OC—R—CONH—R'NH)_nH$$

as more fully described in U.S. Patent No. 2,379,413, R and R' being alkylene chains and $n$ an integer which is varied in the different grades of Versamid according to the specific properties desired. Versamid 100 which is described as a soft, tacky resin that is semi-solid at room temperatures is the linoleic acid polyamide of choice particularly when used to replace the amino formaldehyde in Example I. The polyamides above referred to have the following specifications:

| Versamid | 100 | 115 | 125 |
|---|---|---|---|
| Amine Value | 83–93 | 210–230 | 290–320 |
| Color, Gardner (Solid Resin) | NDT 12 | NDT 12 | NDT 12 |
| Melting Point (ASTM 1240) | 43–53 | Fluid | Fluid |
| Viscosity, Poises, 40° C., #6 spindle, 4 r.p.m | | 500–750 | 80–120 |
| Viscosity, Poises, 150°, #2 spindle, 20 r.p.m | 10–15 | | |
| Percent Ash (by weight) | 0.05 | 0.05 | 0.05 |
| Specific Gravity | 0.98 | 0.99 | 0.97 |
| Pounds per gallon | 8.2 | 8.3 | 8.1 |
| Penetration, 25° C., ASTM D-5-52 | 100 | | |

Although the explanation for the improved adhesion which is promoted by the inclusion of the added resins is not completely clear, the evidence gathered indicates that the promoted improvement in adhesion is the result of a reaction which takes place during the baking step between the two thermosetting resins and which results in a cross linking with the hydroxyl, carboxyl or other reactive groups present in their molecular structure, and which serves to embrace or otherwise bond the polyvinyl chloride particles which are in intimate homogeneous dispersion therewith to the surface. The addition of a single resin such as the thermosetting urea formaldehyde to the composition is not sufficient to promote the desired adhesion although we have found it to be a member of the most useful mixture of added reactive resins.

Urea formaldehyde is the amino aldehyde condensation product of choice and, in our experiments thus far, most satisfactory adhesion to bare metals such as tin plate, sheet aluminum or steel has been obtained where the coating composition includes from 5 to 20 parts thereof. For best adhesion we have found that the composition will additionally include up to 20 parts of a phenolic resin, such as o-cresol formaldehyde and from 1 to 50 parts of liquid epoxy resin, such as the Epon 562 which exists in liquid form at room temperature and, we understand, has an epoxide value of 140–165 per 100 grams, an ester value of 65 per 100 grams and a Gardner-Holdt viscosity of C–F. However, we do not intend to exclude other epoxy resins of greater or lower reactivity and those which are semi-solid or solid at room temperature. We have found, however, that good results are obtained with this particular type. The usefulness of the coating composition, particularly when intended for applying directly to the aforesaid bare metals, is also improved by the addition of from 1 to 20 parts of a solution type low molecular weight copolymer vinyl chloride and vinyl ester which has been modified by the addition of a small amount of maleic acid or anhydride or other material which will introduce terminal or polar groups such as the carboxyl or hydroxyl radicals. An example thereof is the aforementioned Vinylite VMCH and also Geon 400x110. As previously mentioned these latter materials appear to have a particular affinity to the bare metal, although they do not have any great solution compatibility with the higher molecular weight polyvinyl chloride resins. For this reason, we have found it desirable to separately mix the maleic modified copolymer vinyl resins in a sufficient portion of the solvent with which it is compatible so as to form a 15% solution thereof which is kept separated until ready for use. The phenolic resin preferably is also added to this solution rather than directly to the plasticizer dispersion.

To prepare the coating composition we find it advantageous to first add the thermosetting resins, with the exception of the phenolic resins, to the plasticizer and mix with agitation until a homogeneous dispersion has been obtained. We then add the polyvinyl chloride and pigments gradually with agitation until well dispersed therethrough to complete the plastisol. The maleic modified copolymer vinyl resin solution is at this stage added to the plastisols, also with agitation, until intimately and uniformly mixed therewith. Next we add the stabilizers and finally the remaining amounts of solvents necessary to obtain the desired application viscosity. For a reason not entirely clear, we have found that the amino aldehyde condensation product present in homogeneous dispersion with the polyvinyl chloride helps to overcome the incompatibility of the modified lower molecular weight vinyl resin copolymer, sufficiently that the latter when appropriately dissolved in solvent readily mixes with the high molecular weight polyvinyl chloride plastisol. The resultant composition will remain relative stable and without gelling for at least six months if kept at or near room temperature.

The formulation of Example I also preferably includes a small amount of a hydroxyl containing vinyl chloride-vinyl acetate copolymer, such as the aforementioned Vinylite VAGH which improves the adhesion of the composition to an organic surface such as when applied to an intermediate vinyl or other resin coating. It, however, may be omitted if only bare metal surfaces are to be coated with the composition.

The added solvent serves a two-fold purpose. First, it acts as a convenient carrier by which the maleic modified or partially hydrolyzed vinyl resin copolymers and also the phenolic resin may be combined with the polyvinyl chloride plastisol. Secondly, it serves as a diluent for reducing the viscosity of the composition to a useful consistency. For the latter purpose, the amount of added solvent can be varied through a rather considerable range, the indicated proportions in Example I having been found most useful for industrial applications as by roller coating or spraying. Where applied by knife edge, the proportion of solvent may be much less, and even substantially omitted, particularly if thick coatings are sought. On the other hand, where relatively thin coatings are to be applied as by spraying, the composition may be diluted considerably. For most purposes, we have found the practical limits for the solvent to range between the mentioned 0 and 250 parts based on 100 weight parts of the polyvinyl chloride content.

Particularly where the coating composition will contain amounts of the maleic modified vinyl chloride-vinyl acetate copolymer, it has been found essential to observe some care in the selection of solvents. Thus solvents should be selected in which the maleic modified vinyl resin copolymer is soluble since the aforementioned vinyl resin copolymers demonstrate a lack of tolerance for the non-solvents or plasticizers in which the high molecular weight polyvinyl chloride is dispersed, but the therefore necessary increase in solvency of the coating composition must also be carefully regulated to avoid extensive swelling of the polyvinyl chloride. Generally speaking volatile solvents such as the ketones and esters tend to wet and swell the resin while the aromatic or aliphatic hydrocarbon diluents tend to control the swelling and reduce viscosity. Accordingly, although some amount of the volatile solvents such as methyl isobutyl ketone are essential in order to dissolve the lower molecular weight copolymer resins, we try to avoid unnecessary solvation of the higher molecular weight polyvinyl chloride and rely more on solvents such as xylol, toluol and naptha. The latter type solvents will therefore comprise the greater portion by far of the solvent mixture.

EXAMPLE II

A typical coating composition in accordance with the invention having excellent adhesion to bare metal such as tin plate, aluminum sheeting and steel after baking was prepared by dissolving a partially hydrolyzed vinyl chloride-vinyl acetate copolymer such as Vinylite VAGH and maleic modified vinyl chloride-vinyl acetate copolymer such as Geon 400x110 in suitable solvents with phenolic resin to form the following:

*Composition A*

| | | |
|---|---|---|
| Partly hydrolized vinyl chloride-vinyl acetate copolymer (Vinyl VAGH) | lbs | 37½ |
| Maleic modified vinyl chloride-vinyl acetate copolymer (Geon 400x110) | lbs | 1.10 |
| Phenol formaldehyde resin | lbs | 26¼ |
| Propylene oxide | fl. ozs | 260 |
| Butyl Cellosolve | fl. ozs | 390 |
| Isophorone | gals | 21¼ |
| Xylol | gals | 41¼ |
| Naphtha | gals | 15 |

A second composition was also formed embodying a vinyl chloride polymer plastisol containing urea formaldehyde and epoxy resin as thermosetting resins. It had the following approximate formulation:

*Composition B*

| | Lbs. |
|---|---|
| Polyvinyl chloride (Vinylite QYNV) | 480 |
| Urea formaldehyde resin | 120 |
| Epoxy resin | 25 |
| Epoxidized soybean oil (Paraplex G-62) | 90 |
| Acetyl tributyl citrate (Citroflex) | 90 |
| Polyethylene glycol-di-2-ethyl hexoate (Flexol) | 90 |
| 15% wax solution in naphtha | 90 |
| Barium cadmium soap (light stabilizer) | 10 |
| Zinc soap (heat stabilizer) | 5 |

Approximately 240 pounds of Composition A were added to 500 pounds of Composition B under agitation and mixed until a homogeneous dispersion was obtained. This was then reduced to application viscosity by 6 gallons of a 1-2-6 solvent mixture of di-isobutyl ketone, xylol and naphtha and applied by roller coating flat pieces of bare tinplate, aluminum and steel therewith. The coated metal pieces were then baked at approximately 350° F. for 15 minutes. When tested the baked-on coating remained strongly bonded to the metal surface even when the coated metal pieces were severely flexed or scratched vigorously with a sharp object, such as a nail. They also resisted efforts at separation from the metal by insertion of a knife edge between the vinyl resin layer and the metal surface. Several of the coated metal pieces were placed between forming dies and drawn into the shape of bottle or jar covers having threaded sidewalls. In each instance the vinyl resin coating remained adherent to the metal and did not separate even under such harsh treatment.

Similar tests were conducted with pieces of metal coated with polyvinyl chloride dispersions in which the reactive resins were omitted. Although similarly baked, such coatings were easily peeled or lifted off the metal and there was little or no adhesion indicated.

Although the coating composition of Example 2 as above described resulted on baking into a clear gold or amber colored transparent layer, it will be understood that by the addition of selected dyes or pigments, any desired color, as well as degree of opacity can be obtained. Examples of useful pigments, although by no means all inclusive would be titanium, chrome yellow, chrome green, phthalocyanine blue, phthalocyanine green, and red iron oxide. The selected pigment should, of course, be one capable of remaining stable and unaffected by the baking process to which the coatings are necessarily subjected and the amounts added will vary in accordance with the desired intensity of color and/or obscuring power of the selected pigment. The phenolic resins, however, do have a discoloring effect on the resultant coating, and therefore when a particularly pure white or pastel color is desired, it has been found necessary to omit the phenolic resins. Where the coatings are to contain relatively large amounts of pigmentation and of the more opaque colors, the phenolic resin of course presents no problem and is preferably included for increased adhesion.

A particularly clear, essentially colorless and transparent protective coating can be obtained by relying for adhesion on the reaction which takes place between urea formaldehyde and Vinylite VMCH or other maleic modified vinyl chlorine-vinyl acetate copolymer to bond the polyvinyl chloride resin to the substrate surface. Although the resultant adhesion is not equal to that obtained where the adhesion is obtained through the interaction of amino aldehyde, epoxy resin and phenolic resins as aforementioned, the adhesion is nevertheless considerably improved over that of the more usual coating dispersions of polyvinyl chloride resin. Such a composition would comprise the following approximate formulation:

EXAMPLE III

| | |
|---|---|
| High molecular weight polyvinyl chloride__lbs__ | 256 |
| Urea formaldehyde resin_____lbs__ | 11¼ |
| Plasticizer: | |
|    Polyethylene glycol-di-2-ethyl hexoate__gals.__ | 6 |
|    Epoxidized soybean oil | |
|      (Paraplex G–62)_____gals__ | 6 |
|    Acetyl tributyl citrate_____gals__ | 6 |
| Stabilizer: | |
|    Barium cadmium soap_____gals__ | ⅜ |
|    Zinc soap_____gals__ | ⅜ |
| Maleic modified vinyl chloride-vinyl acetate copolymer (Vinylite VMCH)_____gals__ | 38½ |
| Solvent: | |
|    Methyl ethyl ketone_____gals__ | 5¾ |
|    Di-isobutyl ketone_____gals__ | 5 |
|    Xylol _____gals__ | 13¾ |
|    Toluol _____gals__ | 3 |
|    Naphtha _____gals__ | 23 |

For most satisfactory results, the Vinylite VMCH is dissolved in enough of the solvents to form a 15% solution and held apart until ready. The urea formaldehyde resin is then mixed with the plasticizers to form a homogeneous mixture. To this is gradually added, with agitation, the high molecular weight polyvinyl chloride resin and mixing is continued until the polyvinyl chloride has been well dispersed therethrough. The VMCH 15% solution is then added to the mixture, with agitation, after which stabilizers and remainder of the solvents are added.

If a white opaque coating is sought, this can be produced by modifying the composition of Example III by addition of suitable amounts of titanium pigment. Such a composition would have the following approximate formulation:

EXAMPLE IV

| | |
|---|---|
| High molecular weight polyvinyl chloride____lbs__ | 256 |
| Urea formaldehyde resin_____gals__ | 11¼ |
| Plasticizer: | |
|    Polyethylene glycol-di-2-ethyl hexoate__gals.__ | 6 |
|    Acetyl tributyl citrate_____gals__ | 6 |
|    Di-2-ethyl hexyl phthalate_____gals__ | ⅜ |
| Stabilizer: | |
|    Barium cadium soap_____gals__ | ⅜ |
|    Zinc soap_____gals__ | ⅜ |
|    Tribasic lead phosphite_____lbs__ | 2½ |
| Maleic modified vinyl chloride-vinyl acetate copolymer (Vinylite VMCH)_____lbs__ | 38½ |
| Solvent: | |
|    Xylol _____gals__ | 12½ |
|    Toluol _____gals__ | 3 |
|    Methyl isobutyl ketone_____gals__ | 5¾ |
|    Di-isobutyl ketone_____gals__ | 4 |
|    Naphtha _____gals__ | 22 |
| Pigment: | |
|    Titanium pigment_____lbs__ | 51¼ |
|    Epoxidized soybean oil | |
|      (Paraplex G–62)_____gals__ | 3 |

In the above example, the pigment is first dispersed in the epoxidized soybean oil. The pigment containing plasticizer is then added to the plastisol after the polyvinyl chloride resin has been dispersed therein and before addition of the solution of the VMCH thereto. In other respects the composition of Example IV was prepared according to the procedure described in Example III.

In either of Examples III or IV, other plasticizer and solvents, as well as other heat and light stabilizer as previously taught, may be used in place of those illustrated. Furthermore, the maleic modified vinyl chloride-vinyl acetate copolymer can be replaced in whole or in part by a partially hydrolyzed copolymer of said vinyl chloride and vinyl polymer, such as Vinylite VAGH, particularly if the coating is to be applied to an organic surface, such as a layer of dry paint. Also, it should be understood that in place of urea formaldehyde, other amino aldehydes, such as melamine or triazine formaldehyde might be used as the heat reactant with the vinyl resin copolymer.

Thus far we have described the production of coating having a smooth uniform finish which may be of varying transparency, opacity or color dependent on whether pigments or dyes are included in the composition and/or whether phenolic resin with its attendant discoloring effect is employed as one of the adhesive promoting resins.

We, however, have found that with only a further slight modification of our coating composition, as by the addition thereto of selected surfactants, chelating agents or mixtures thereof in controlled proportions, we are able to obtain a great variety of attractive patterned effects simulating that of beaten metal, fabric, leather and the like. Further we can obtain these interesting surface effects by the application of a single coating, without the need of a primer coat to obtain adhesion or without dependence upon physical force, pressure or the swelling effect of strong solvents to achieve the surface irregularity required. For example we have found that if we add a small amount of a non-leafing grade of aluminum flake or paste to our coating composition together with smaller amounts of silicone oil, the baked coating will take on a finish closely resembling that of beaten metal. By silicone oil we mean the available linear polymers which exist in fluid form and have the formula

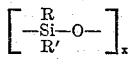

wherein R is methyl and R' is methyl or phenyl. To obtain the beaten metal or hammered effect we preferably add about 12½ parts by weight of the non-leafing aluminum paste per 100 parts of the polyvinyl chloride resin contained in the composition and approximately ¾ parts of silicone oil. We also found that by omitting the silicone oil and using the aluminum flake alone we would obtain a smooth metallic or silver non-hammered appearance for the coating. Either effect would, of course, be in addition to any coloring we could achieve by addition of pigment to the composition.

We further found that by increasing the amount of silicone oil beyond the mentioned ¾ parts up to approximately 3 parts which is considered a useful maximum while holding the aluminum flake portion constant we could proportionally diminish the texture of the resultant coating so as to obtain a much finer or more delicate beaten metal effect. Conversely by varying the amount of non-leafing aluminum flake and holding the silicone oil content constant we could considerably vary the degree of brilliance and opacity. For these purposes we found a useful range for the non-leafing aluminum flake would comprise from about 2 to 50 parts per 100 parts of the polyvinyl chloride resin content, the smaller proportion of aluminum flake providing the coating with a duller but more transparent appearance while the higher amounts would increase brilliance as well as opacity of the coating.

Furthermore, if a leafing type of aluminum flake were employed in place of the non-leafing aluminum flake the resultant coating on baking would have a fine delicate lacy network of metal over its surface which is particularly effective in appearance as when the coating also contains a sufficient quantity of pigment to give it an opaque colored background visible through the delicate silvery lacework provided by the leafing aluminum flake. Similar effects may also be obtained by using various other metal flakes or powders such as for example, bronze powder, flakes of stainless steel, lead, etc. However, dependent on the shape and size of the selected metal particles, some variation in the proportions will be necessary to obtain comparable effects. Thus when using bronze powder, we prefer to use stronger concentrations than in the case of aluminum, the range for bronze powder being more nearly between 10 and 100 weight parts per 100 parts of polyvinyl chloride resin to obtain effects comparable to that obtained using 2 to 50 parts of aluminum flake. Here again, the amounts of texturing agent and/or metal flakes or powders will depend on the particular surface finish or textures one desires to create. Obviously also, other effects can be obtained by utilizing dyed metal flakes.

An example of a useful composition for producing a hammered or beaten metal effect in a single application by spray or roller coating technique, and which requires no additional processing to produce the hammer marking effect other than baking at a temperature near 350° F. for 15 to 20 minutes, would be as follows:

EXAMPLE V

|  | Parts by weight |
|---|---|
| Polyvinyl chloride | 239 |
| Urea formaldehyde | 60 |
| Epoxy resin | 12 |
| Epoxidized soybean oil (Paraplex G-62) | 48 |
| Acetyl tributyl citrate | 48 |
| Polyethylene glycol-di-2-ethyl hexoate | 48 |
| 15% wax in naphtha solution | 48 |
| Di-2-ethyl hexyl phthalate | 3 |
| Tribasic lead maleate | 9 |
| Light stabilizer (e.g. cadmium barium soap) | 5 |
| Heat stabilizer (e.g. zinc soap) | 2½ |
| Composition A from Example II (solution containing maleic and partially hydrolized copolymers of vinyl chloride and vinyl acetate plus phenolic resin) | 239 |
| Diisobutyl ketone | 14 |
| Xylol | 28 |
| Naphtha | 84 |
| Non-leafing aluminum paste | 30 |
| Silicone oil | 2 |

For most satisfactory results, the aluminum paste is first dispersed in portion of the plasticizer and the remainder of the formulation is then prepared in accordance with the procedure described in connection with Example II. As the last step in the process, the silicone oil is added and dispersed therethrough. Pigment for color as desired is also added. If a delicate, fine, lacy metallic finish is desired, in contradistinction to a beaten metal effect, the non-leaf grade of aluminum paste is replaced in the formula with a leafing type of aluminum flake.

An irregular surface texture resembling that of leather can be obtained if in place of the silicone oil and metal flakes we add a proportion of a larger particle size of vinyl chloride resin having a very low order of solubility even at elevated temperatures such as the polyvinyl chloride known under the trademark Exon 666 which is understood to have a molecular weight ranging between 20,000 and 30,000 and a particle size more closely approaching 75 microns. Conceivably instead of polyvinyl chloride particles, one could add similarly sized particles of other materials, organic or inorganic in character, even fine sand, providing the material was of relatively low solubility and would remain relatively inert and unaffected at the baking temperatures. We, however, prefer to use the aforementioned larger-particle sized polyvinyl chloride so as to retain as much as possible the compatibility between components of the coating as well as the protective and other characteristics inherent to polyvinyl chloride resin coatings. Although obviously, the amount of resin particles added to obtain the irregular surface texture can be considerably varied we have found that useful limits therefor will comprise a maximum of approximately 160 weight parts based on 100 parts of polyvinyl chloride while we have found a particularly useful proportion to comprise about 65 parts. The irregular texture simulating leather results because the much larger polyvinyl chloride particles have a tendency to form agglomerates on the substrate surface and of consequence limit the flow properties of the coating. Moreover the smaller sized dispersion resin particles which comprise the basic composition, such as Vinylite QYNV or Goodyear Exon 654, are ordinarily formulated with softening agents or surface active agents which tend to repel the larger size polyvinyl chloride particles and so keep the agglomerates more distinct. The result is that upon application of the coating to a surface as through spraying or roller coating, the larger sized resin particles agglomerate because of their poorer flow characteristics and do not level out during the baking step. The result is that ridges are developed in the coating which characterizes various leathers. Obviously by controlling the proportions or by selecting a different particle size of the added polyvinyl chloride greater or smaller than the aforementioned 75 microns, various leather finishes can be simulated.

The leather-like appearance thus achieved for the coatings can be further enhanced by adding to the composition a fraction of one weight part of chromogen per 100 parts of polyvinyl chloride. By chromogens we mean materials which when subjected to the temperatures of the baking step will develop into a color as for example through a reaction with organo-metal compounds or salts added to the composition for their light and/or heat stabilizing effect on the polyvinyl chloride. The color obtained through the development of the chromogens can, of course, be in addition to that obtained by reason of any pigment content added to the composition and so as to produce in effect a multi-colored coating. The additional coloring may be obtained for example, by adding various diazo dye compounds or primary, secondary or tertiary amines which will react with heavy metals such as zinc under the action of heat to introduce color. The effect may also be obtained by adding into the formulation trace amounts of copper naphthenate and a mixture of sodium citrate, sodium carbonate, glucose or ordinary sugar. The secondary color also might be obtained through a Lieberman reaction which will form a brilliant blue violet complex if a few crystals of cholesterol are added to the formulation along with trace amounts of ether, chloroform and a very dilute solution of sulfuric acid.

Although not limited thereto, the chromogens are particularly effective when added with the large sized particles of polyvinyl chloride resin to provide coating compositions for producing leather-like texture finishes. In this particular application the chromogens may be caused to develop a color shadow of varying density in the coating through which the basic pigment color is visible and which, with the irregular texture resulting from the inclusion of the larger particle size polyvinyl chloride, obtains a coloring variation strongly simulating that characteristic of leathers. Actually the color developed by the chromogens does not attach to the larger particle size polyvinyl chloride but is distributed non-uniformly through the coating in order to give a varying degree of discoloring strength through which the basic color is visible. Obviously by combining the coloring effect achieved by the chromogens with the color obtained by the addition of various pigments, and with or without texturing agents and/or surfactants, a wide variety of novel pattern and coloring effects can be obtained.

An example of a composition useful to obtain a tough leather appearing coating in a single application by roller coating or spraying would comprise:

EXAMPLE VI

| | Parts by weight |
|---|---|
| Polyvinyl chloride plastisol (Composition B of Example II) | 250 |
| Large particle sized polyvinyl chloride (Exon 666) | 85 |
| Monoethanolamine (chromogen) | 3 |
| Naphtha | 15 |
| 1/2/6 solvent mixture of di-isobutyl ketone-xylol-naphtha | 60 |
| Titanium pigment (dispersed in a portion of the Paraplex G-62 from Composition B above) | 25 |

In this example the large particle sized polyvinyl chloride was slowly added to the polyvinyl chloride plastisol with agitation and when well dispersed therethrough, the solution of Vinylite VAGH, VMCH and phenolic resin was added, followed in sequence by addition of the stabilizers, naphtha, titanium pigment disperson and the monoethanolamine. Finally, the viscosity of the composition was lowered by the addition of the solvent mixture to obtain the desired consistency for roller coating.

The coating composition was applied by roller coating one side of a flat metal strip which was thereafter baked until the solvent had been evaporated and the coating fused into a tough strongly adherent film. The resultant coating was white in color by reason of the titanium pigment dispersed therethrough and it had an irregular patterned surface texture with ridges and intervening valleys simulating the appearance of leather. In the course or baking, the chromogen, monoethanolamine, was reacted with the barium-cadmium organic complex from Composition B and provided a dark shadowy effect running through the coating, which materially helped its simulation of leather.

We have also found that if we increase the amount of the large particle sized polyvinyl chloride added to the coating compositions we can develop a coating on baking which will not only have much more prominent and higher ridges of irregular size and shape but a coating which will vary in transparency by reason of the thinness of the coating material in the intervening valleys between the heavier opaque deposits caused by the larger sized resin particles. By controlling the viscosity of the coating composition, breakthrough or openings may be formed in these valleys between the higher ridges to provide a skeletonized or pitted coating. Consequently, a further novel and distinctive effect can be obtained by applying a first or primer coating onto the base and then applying thereto a skeletonized coating or one of varying density. Obviously the first coat may be a composition such as described in accordance with our invention or it may be of any other suitable composition such as the aforementioned primer coats. Preferably it will be of the type having a smooth surface texture or finish and opaque color although this will of course be a matter of choice.

The three dimensional effect of coatings obtained either through using the metal flakes or the large particles of polyvinyl chloride can also be taken advantage of by printing thereover further patterns so as to simulate the weave of many textiles.

From the above description it thus will be apparent that all of the objects and advantages recited previously for the invention have been demonstrated as obtainable in a convenient simple and practical manner. Furthermore, it will be understood that the examples given are to be considered only as illustrative of the invention and that many further variations in the compositions, the resultant coatings and methods of application will suggest themselves and are intended to be included within the broad teachings of the invention, and that the invention is not therefore to be considered limited to the specific examples, but only as defined by the claims hereto appended.

Now having described our invention, we claim:

1. A metal substrate having a baked-on tough resistant flexible coating directly adhering to its surface and comprising a major quantity of plasticized high molecular weight polyvinyl chloride normally having low adherence to a metal surface, said polyvinyl chloride being homogeneously dispersed through a smaller quantity of the cross-linked product of at least two heat-reactive resins selected from the group consisting of amino aldehyde condensation product, fatty acid polyamide, epoxy resin, phenolic resin, maleic modified-vinylchloride-vinylacetate copolymer and partially hydrolyzed vinylchloride-vinylacetate copolymer, one of said resins being an amino aldehyde condensation product, and said cross-linked product strongly bonding the polyvinyl chloride directly to said metal surface.

2. A substrate having a tough, inert protective coating of resin directly adhering to a surface thereof, said resin coating comprising the baked-on fused product of a homogeneous dispersion of plasticized polyvinyl chloride particles containing uniformly distributed therethrough the heat-reaction product of amino aldehyde condensation product, epoxy resin, phenolic resin, maleic-modified copolymer of vinyl chloride and vinyl acetate and partially-hydrolyzed copolymer of vinyl chloride and vinyl acetate, said coating being essentially solvent-free.

3. A coated article having a surface provided with a baked-on tough resistant coating adhering directly to said surface, the coating comprising heat-fused product of a plastisol of high molecular weight small particle-sized polyvinyl chloride of the order of 0.2 to 2.0 microns containing the reaction product of at least two heat-reactive resins homogeneously dispersed therethrough selected from the group consisting of amino aldehyde condensation product, fatty acid polyamide, epoxy resin, phenolic resin, maleic modified-vinylchloride-vinylacetate copolymer and partially hydrolyzed vinylchloride-vinylacetate copolymer, one of said two heat-reactive resins being selected from the group consisting of amino aldehyde condensation product and fatty acid polyamide when the other comprises one of the mentioned copolymers, said coating further containing substantially inert particulate material of low solubility in the coating randomly distributed therethrough which imparts an irregular surface texture to said coating.

4. The coated article of claim 3 wherein said substantially inert particulate material comprises particles of high molecular weight polyvinyl chloride of the order of 75 microns which by reason of their larger size are less susceptible to heat than the dispersed, smaller particle-sized polyvinyl chloride and retain their discrete particulate character.

5. The coated article of claim 4 containing heat and light stabilizers for the plastisol and the reaction product of a chromogen with at least a portion of one of said stabilizers plus pigment.

6. A substrate having a baked-on tough and resistant coating adhering to a surface thereof, said coating comprising plasticized high molecular weight polyvinyl chloride containing the reaction product of a mixture of at least two heat-reactive resins dispersed therethrough, said two heat-reactive resins being selected from the group consisting of amino aldehyde condensation product, fatty acid polyamide, epoxy resin, phenolic resin, maleic modified-vinylchloride-vinylacetate copolymer and partially hydrolyzed vinylchloride-vinylacetate copolymer, one of said two heat-reactive resins being selected from the group consisting of amino aldehyde condensation product and fatty acid polyamide when the other comprises one of the mentioned copolymers, said coating further containing silicone oil and non-leafing metallic particles affording an irregular surface texture to the coating.

7. A substrate having a baked-on tough and resistant coating adhering to a surface thereof, said coating comprising a heat-fused continuous film of plasticized high molecular weight polyvinyl chloride containing the reaction product of a mixture of at least two heat-reactive resins uniformly dispersed therethrough, said heat-reactive resins being selected from the group consisting of amino aldehyde condensation product, fatty acid polyamide, epoxy resin, phenolic resin, maleic modified vinylchloride-vinylacetate copolymer and partially hydrolyzed vinylchloride-vinylacetate copolymer, one of said two heat-reactive resins being selected from the group consisting of amino aldehyde condensation product and fatty acid polyamide when the other comprises one of the mentioned copolymers, said coating further containing silicone oil and leafing type metallic particles affording a metallized surface texture to said coating.

8. A substrate having a baked-on tough and resistant coating adhering to a surface thereof, said coating comprising a heat-fused continuous film of plasticized high molecular polyvinyl chloride containing dispersed therethrough, the reaction product of a mixture of at least two different heat-reactive resins selected from the group consisting of amino aldehyde condensation product, fatty acid polyamide, epoxy resin, phenolic resin, maleic modified-vinylchloride-vinylacetate copolymer and partially hydrolyzed vinylchloride-vinylacetate copolymer, one of said two heat-reactive resins being selected from the group consisting of amino aldehyde condensation product and fatty acid polyamide when the other comprises one of the mentioned copolymers, said coating further containing metallic particles as a surface texture controlling agent.

9. Method of coating the surface of a substrate with a protective layer of polyvinyl chloride which normally has a reluctance to bond thereto comprising the steps of applying directly to said surface a coating of high molecular weight polyvinyl chloride particles having a particle size of approximately 0.2 to 2.0 microns homogeneously dispersed through plasticizer and non-aqueous organic solvent, said coating containing at least two heat-reactive resins, said resins being selected from the group consisting of amino aldehyde condensation product, fatty acid polyamide, epoxy resin, phenolic resin, maleic modified-vinylchloride-vinylacetate copolymer and partially hydrolyzed vinylchloride-vinylacetate copolymer having reactive groups in their molecular structure which will react to form a cross-linked product at temperatures sufficient to fuse the polyvinyl chloride resin particles into a continuous film, one of which comprises an amino aldehyde condensation product, and baking the applied coating at said temperatures until the solvent has been essentially removed and the resins have reacted with each other to leave a fused layer of polyvinyl chloride which strongly adheres to said surface.

10. Method of claim 9 wherein the heat-reactive resins comprise at least an amino formaldehyde condensation product, an epoxy resin and a phenolic resin.

11. Method of claim 10 wherein the heat-reactive resins also include maleic modified and partially hydrolyzed copolymers of vinyl chloride and vinyl acetate.

12. Method of claim 9 wherein the coating further contains particles of material which remain inert and insoluble with the other ingredients of the coating through the temperatures at which the coating is applied and baked to produce an irregular surface of desired texture on the coating as a result of its baking.

13. A coating composition comprising a sol of high molecular weight polyvinyl chloride particles of approximately 0.2 to 2.0 microns in size homogeneously dispersed in plasticizer and non-aqueous organic solvent, said polyvinyl chloride particles being normally characterized by poor adherence to smooth surfaces including metal when a sol thereof is applied as a coating to such surfaces and baked sufficiently to fuse the particles to a continuous film, said composition containing uniformly dispersed therethrough at least two resins selected from the group consisting of amino aldehyde condensation product, fatty acid polyamide, epoxy resin, phenolic resin, maleic modified-vinylchloride-vinylacetate copolymer and partially hydrolyzed vinylchloride-vinylacetate copolymer which are capable of reacting with each other under the application of heat sufficient to fuse the polyvinyl chloride resin particles, one of said resins being an amino-aldehyde condensation product.

14. The coating composition of claim 13 wherein said amino aldehyde condensation product is contained in the proportion of approximately 5 to 20 parts by weight per 100 parts of polyvinyl chloride.

15. The coating composition of claim 13 wherein the reactive resins comprise about 5 to 25 parts of an amino formaldehyde, about 1 to 50 parts of epoxy resin and 1 to 25 parts of phenolic resin.

16. The coating composition of claim 13 further containing particles of high molecular weight polyvinyl chloride of the order of 75 microns which remain inert and relatively insoluble through the range of temperatures required to fuse the polyvinyl chloride dispersion particles.

17. A coating composition adapted on baking to form a tough resistant coating of high molecular weight polyvinyl chloride which directly adheres to smooth surfaces including metal, said composition comprising the following approximate parts by weight:

| | |
|---|---|
| High molecular weight polyvinyl chloride particles of about 0.2 to 2.0 microns in size | 100 |
| Plasticizer | 15–100 |
| Heat stabilizer | 2–10 |
| Light stabilizer | 1–6 |
| Amino formaldehyde | 5–20 |
| Heat-reactive resin: | |
|    Phenolic resin | 0–25 |
|    Epoxy resin | 0–50 |
|    Maleic modified vinyl chloride-vinyl acetate copolymer | 0–25 |
|    Partially hydrolyzed vinyl-chloride-vinyl acetate copolymer | 0–25 | and the balance non-aqueous organic solvent, the composition containing some proportion of at least one of said heat-reactive resins, the total amount of said heat-reactive resins not exceeding about 50 parts.

18. The coating composition of claim 17 further containing up to 50 parts by weight of aluminum flakes.

19. The coating composition of claim 17 further containing approximately 12.5 parts by weight of non-leafing aluminum flake and .75 part of silicone oil.

20. The coating composition of claim 19 further containing up to 160 parts by weight of larger sized polyvinyl chloride particles.

21. The coating composition of claim 20 further containing approximately 65 parts by weight of polyvinyl chloride particles of 75 microns in size.

22. A coating composition adapted on baking to form a tough resistant coating of high molecular weight polyvinyl chloride which directly adheres to smooth surfaces including metal, said composition comprising the following approximate parts by weight:

| | |
|---|---|
| High molecular weight polyvinyl chloride particles of 0.2 to 2.0 microns in size and which have poor adherence to metal | 100 |
| Plasticizer | 15–100 |
| Heat stabilizer | 2–10 |
| Light stabilizer | 1–6 |
| Fatty acid polyamide | 5–20 |

Heat-reactive resin:
Phenolic resin _____ 0–25
Epoxy resin _____ 0–50
Maleic modified vinyl chloride-vinyl acetate
   copolymer _____ 0–25
Partially hydrolyzed vinyl-chloride-vinyl acetate copolymer _____ 0–25 and the balance non-aqueous organic solvent, the composition containing some proportion of at least one of said heat-reactive resins sufficient to react with the fatty acid polyamide when the composition is applied as a thin coating to a metal surface and baked so as to bond the high molecular weight polyvinyl chloride particles to said metal surface, the total amount of said heat-reactive resins not exceeding about 50 parts.

23. A metal surface having a baked-on tough resistant flexible coating directly adhering to said surface and comprising plasticized high molecular weight small particle sized polyvinyl chloride normally having poor adherence to metal, said resin being homogeneously dispersed through the cross-linked product of at least two heat-reactive resins selected from the group consisting of amino aldehyde condensation product, fatty acid polyamide, epoxy resin, phenolic resin, maleic modified-vinylchloride-vinylacetate copolymer and partially hydrolyzed vinylchloride-vinylacetate copolymer, at least one of said resins being a fatty acid polyamide, said product strongly bonding the polyvinyl chloride to said metal surface.

24. Method of coating the surface of a substrate with a protective layer of polyvinyl chloride comprising the steps of applying to said surface a coating of high molecular weight small particle sized polyvinyl chloride particles which normally have poor adherence to said surface, said particles being homogeneously dispersed through plasticizer and non-aqueous organic solvent further containing at least two heat-reactive resins selected from the group consisting of amino aldehyde condensation product, fatty acid polyamide, epoxy resin, phenolic resin, maleic modified-vinylchloride-vinylacetate copolymer and partially hydrolyzed vinylchloride-vinylacetate copolymer, said resins having reactive groups in their molecular structure which will combine to form a cross-linked product at temperatures sufficient to fuse the polyvinyl chloride into a continuous film, one of said resins being a fatty acid polyamide, and baking at temperatures sufficient to evaporate the solvent, to fuse the high molecular weight polyvinyl chloride particles and to react said resins with each other to form a continuous film of polyvinyl chloride containing a reactive product of said resins homogeneously dispersed therethrough which film strongly adheres directly to the said surface.

25. A coating composition comprising an organosol of polyvinyl chloride particles homogeneously dispersed in plasticizer and non-aqueous organic solvent, said polyvinyl chloride particles having a molecular weight of 20,000 to 30,000, an intrinsic viscosity of 0.2 to 0.3 and a particle size of approximately 0.2 to 2.0 microns, and said composition further containing uniformly dispersed therethrough at least two resins selected from the group consisting of amino aldehyde condensation product, fatty acid polyamide, epoxy resin, phenolic resin, maleic modified-vinylchloride-vinylacetate copolymer which are capable of reacting with each other, under the application of heat sufficient to fuse the polyvinyl chloride resin particles, at least one of said resins being a fatty acid polyamide.

References Cited in the file of this patent
UNITED STATES PATENTS

| | | |
|---|---|---|
| 2,337,424 | Stoner et al. | Dec. 21, 1943 |
| 2,411,590 | Powell | Nov. 26, 1946 |
| 2,563,898 | Wilson et al. | Aug. 14, 1951 |
| 2,581,908 | Kinzinger | Jan. 8, 1952 |
| 2,607,754 | Ellingboe et al. | Aug. 19, 1952 |
| 2,637,621 | Auer | May 5, 1953 |
| 2,743,192 | White | Apr. 24, 1956 |
| 2,795,565 | Newey | June 11, 1957 |
| 2,843,557 | Safford | July 15, 1958 |
| 2,844,557 | Welch | July 22, 1958 |
| 2,892,808 | Shafer | June 30, 1959 |